United States Patent [19]

Wernet et al.

[11] Patent Number: 5,206,297

[45] Date of Patent: Apr. 27, 1993

[54] ELECTRICALLY CONDUCTIVE MOULDING COMPOSITIONS AND FILLERS FROM POLYHETEROAROMATIC COMPOUNDS AND POLYMERIC SULFATES

[75] Inventors: Wolfgang Wernet, Freiburg, Fed. Rep. of Germany; Friedrich Lohse, Oberwil, Switzerland; Jürgen Finter; Hartmut Bleier, both of Freiburg, Fed. Rep. of Germany; Bruno Rotzinger, Aesch, Switzerland; Thomas Vogel, Freiburg, Fed. Rep. of Germany

[73] Assignee: Ciba-Geiby Corporation, Ardsley, N.Y.

[21] Appl. No.: 665,494

[22] Filed: Mar. 6, 1991

[30] Foreign Application Priority Data

Mar. 8, 1990 [CH] Switzerland .................... 759/90

[51] Int. Cl.⁵ .................... C08F 271/02; C08F 273/00
[52] U.S. Cl. .................... 525/279; 525/291; 252/500
[58] Field of Search .................... 525/279, 291; 252/500

[56] References Cited

U.S. PATENT DOCUMENTS

| | | | |
|---|---|---|---|
| 4,552,927 | 11/1985 | Warren | 525/279 |
| 4,692,225 | 9/1987 | Witucki et al. | |
| 4,771,111 | 9/1988 | Tieke et al. | |
| 5,034,463 | 7/1991 | Brokker-Zijp et al. | |
| 5,061,401 | 10/1991 | Wernet et al. | 525/500 |

FOREIGN PATENT DOCUMENTS

| | | |
|---|---|---|
| 0129070 | 12/1984 | European Pat. Off. |
| 0191726 | 8/1986 | European Pat. Off. |
| 0358188 | 3/1990 | European Pat. Off. |
| 2124635 | 2/1984 | United Kingdom |
| 2134125 | 8/1984 | United Kingdom |

OTHER PUBLICATIONS

Synthetic Metals, 22 (1987), pp. 145–156, Bi, et al.
J. of Polym. Science, P. C. E. 23, (1985) pp. 1687–1698, De Paoli, et al.
Konoi, et al. Bull. Chem. Soc. Jpn. 60, (1987), pp. 3315–3320.
Chem. Commun. (1986), pp. 1415–1417, Ohtani, et al.
Jasne, et al. Synthetic Metals, 15 (1986), pp. 175–182.
Abstract For DE 3,402,133.
Bull. Chem. Soc. Jpn. 62, pp. 234–238 (1989) Ohtani et al.

*Primary Examiner*—John Kight, III
*Assistant Examiner*—John M. Cooney, Jr.
*Attorney, Agent, or Firm*—Kevin T. Mansfield; Luther A. R. Hall

[57] ABSTRACT

Moulding composition in the form of particles of a) at least one polyheteroaromatic compound or an aniline in the oxidised, polycationic form, especially polypyrrole, and b) at least one polyanion of a thermoplastic polymer having sulfated alcohol groups

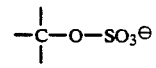

in recurring structural units. Mouldings obtained from the moulding compositions have a high electrical conductivity and good mechanical strength properties. The mouldings can be used as electrodes, electrically conductive fibers or components for electromagnetic screening. The pulverulent moulding compounds are also suitable as electrically conductive fillers for plastics.

24 Claims, No Drawings

ELECTRICALLY CONDUCTIVE MOULDING COMPOSITIONS AND FILLERS FROM POLYHETEROAROMATIC COMPOUNDS AND POLYMERIC SULFATES

The invention relates to moulding compositions in the form of particles of a) at least one oxidised, polycationic polyheteroaromatic compound and b) at least one polyanion of a thermoplastic polymer having sulfated alcohol groups

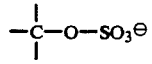

in recurring structural units, to processes for producing the moulding compositions, to the use of the moulding compositions for producing electrically conductive mouldings and to the use of the finely disperse, electrically conductive compositions as fillers for plastics.

It is known that electrically conductive salts of polycationic polyheteroaromatic compounds are obtained by electrochemical polymerisation of heteroaromatic compounds, especially pyrrole, in the presence of non-nucleophilic anions. The mechanical properties of such salts of polyheteroaromatic compounds, as a rule deposited as a film on anodes, are inadequate for many applications.

To improve the mechanical properties, it has been suggested to use compositions of doped polyheteroaromatic compounds in non-conductive polymers, cf. for example Synthetic Metals, 22 (1987), 145–156; J. of Polym. Science: P.C.E., 23 (1985), 1687–1698, Bull. Chem. Soc. Jpn., 60, 3315–3320 (1987) and EP-A-0,191,726. In order to avoid the additional use of dopants, it has also already been suggested to use nonnucleophilic polymeric anions additionally in the electrochemical polymerization, for example polystyrenesulfonates, polyvinylsulfonates (cf. for example EP-B-0,129,070 and U.S. Pat. No. 4,552,927) or latices (cf. Synthetic Metals, 15 (1986), 175–182). In Bull. Chem. Soc. Jpn. 62 (1989), 234–238, moulding compositions are described which contain, for example, polystyrenesulfonic acid as the anionic component.

In DE-A-3,402,133, porous compositions of polypyrrole with, for example, alkylsulfates are described. It is mentioned that sulfates having polymeric radicals can also be used. In GB-A-2,124,635, a film-like composition of polypyrrole and a chlorosulfonated polyvinyl alcohol is described. The dried film admittedly has good electrical conductivity and is described as tough but brittle, so that it does not possess adequate mechanical strength.

In U.S. Pat. No. 4,692,225, it is suggested to incorporate powders of doped polyanilines or polypyrroles into thermosetting plastics, especially epoxy resins. However, the electrical conductivity of such mouldings is too low for many applications.

There is a demand for electrically conductive polymeric compositions in the form of free-flowing powders which can be processed by moulding methods to give diverse mouldings which have good mechanical properties, for example high tensile and flexural strengths and good toughness properties, and which at the same time can be incorporated as fillers into polymers, the mouldings thereof having good mechanical properties and electrical conductivities.

One subject of the invention is a moulding composition in the form of particles of a) at least one polyheteroaromatic compound or an aniline in the oxidised, polycationic form and b) at least one polyanion of a film-forming thermoplastic polymer having sulfated alcohol groups

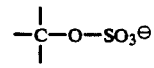

in recurring structural units.

Within the scope of this invention, polyheteroaromatic compounds are understood as homo- and copolymers which contain recurring heteroaromatic structural units. They can be of relatively high molecular weight or else oligomeric, provided that they are solid at room temperature and are capable of film formation. Polyheteroaromatic compounds of 5-or 6-membered rings which contain 1 to 3, preferably 1, heteroatoms from the group comprising —O—, —S— and —N— and whose C atoms are unsubstituted or substituted by $C_1$–$C_{16}$alkyl, especially $C_1$–$C_{12}$alkyl, are preferred. Preferably, 2 C atoms are unsubstituted, in order to enable the electrochemical or chemical polymerisation to be carried out. The 5- or 6-membered ring is preferably selected from the group comprising pyrrole, thiophene, furan, 2,2'-bipyrrole, 2,2'-bithiophene, 2,2'-bifuran, thiazole, oxazole, thiadiazole and imidazole.

Particularly preferably, the polyheteroaromatic compound is formed from a pyrrole of the formula

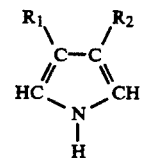

in which $R_1$ and $R_2$ independently of one another are H or $C_1$–$C_{16}$alkyl or $C_1$–$C_{16}$alkoxy, or $R_1$ and $R_2$ together are trimethylene or tetramethylene. $R_1$ and $R_2$ can, for example, be $C_1$–$C_{12}$alkyl or $C_1$–$C_{12}$alkoxy, for example methyl, methoxy or ethyl or ethoxy and, especially, are H. The NH group of the pyrrole can be substituted by $C_1$–$C_{12}$alkyl, especially $C_1$–$C_6$alkyl. $R_1$ and $R_2$ together can also be trimethylene or tetramethylene.

The anilines can, for example, be aniline itself and an aniline which is substituted in the 3-position by $C_1$–$C_{12}$alkyl or $C_1$–$C_{12}$alkoxy, preferably $C_1$–$C_6$alkyl or $C_1$–$C_6$alkoxy.

The moulding composition according to the invention comprises, per structural unit of the polyheteroaromatic compound, preferably 0.1 to 0.5 and particularly preferably 0.2 to 0.4 of a structural unit having sulfated alcohol groups

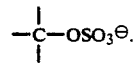

The particle size is, for example, 1 to 5000 μm, preferably 1 to 3000 μm and particularly preferably 10 to 1000 μm.

The thermoplastic polymer, used in the moulding composition according to the invention, having sulfated alcohol groups

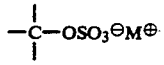

in the form of salts preferably has a glass transition temperature from −100° to 350° C. and particularly preferably −50° to 250° C., measured by the DSC method (Differential Scanning Calorimetry). M⊕ is an alkali metal cation or an ammonium cation, which are described below for the polymers.

The tensile strength of this thermoplastic polymer is preferably at least 5 MPa and particularly preferably at least 10 MPa, measured according to DIN 53 455. Depending on the type of the polymers, the tensile strength can be up to 1000 MPa, preferably up to 500 MPa and especially preferably up to 300 MPa. The degree of polymerisation can, for example, be 5 to 10,000, preferably 10 to 5000 and especially preferably 10 to 1000.

The ratio of free alcohol groups to sulfated alcohol groups

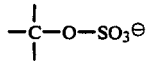

in the thermoplastic polymer can, for example, be from 50:1 to 1:50, preferably 10:1 to 1:10.

The sulfated alcohol groups can be bound as secondary groups

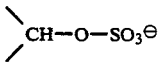

or tertiary groups

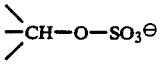

in the polymer backbone, or in side groups of the polymer as terminal primary groups —CH₂—O—SO₃⊖ or as secondary groups

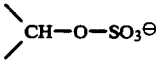

or as tertiary groups

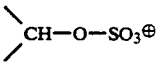

in positions along the chain.

The thermoplastic polymers can be based on different polymers with hydroxyl groups, or mixtures thereof, for example polyesters, polyester-amides, polyurethanes, polyamides, polycarbonates and polyimides or monomers with hydroxyl groups, saponified polymers of vinyl esters or vinyl ethers hydroxylated polydiolefins, for example polybutadine, polyisoprene or chloroprene, polyacrylates or polymethacrylates with hydroxyalkyl radicals in the ester group, polysiloxanes with hydroxyalkyl groups or reduced polyketones or copolymers thereof; and also copolymers of vinyl alcohol, acrylates or methacrylates or diolefins with comonomers, for example acrylonitrile, olefins, diolefins, vinyl chloride, vinylidene chloride, vinyl fluoride, vinylidene fluoride, styrene, α-methylstyrene, maleic anhydride, maleimide, vinyl ethers and vinyl esters.

The sulfated thermoplastic polymers are preferably based on polymers from the group comprising polyadducts of glycidyl compounds having more than one epoxide group on average and a diol; homo- and co-polymers of hydroxyalkyl acrylates or methacrylates; homo- and co-polymers of butadiene, isoprene and chloroprene, whose double bonds are partially hydroxylated; polyimides of hydrogenated ketotetracarboxylic acids, especially benzophenonetetracarboxylic acids; hydroxyalkylpolysiloxanes; and polyesters, polyamides, polyurethanes and polyimides of C₄-C₁₂alkylenediols or -diamines, whose double bond is hydroxylated.

The thermoplastic polymer can, for example, be an at least partially sulfated polyadduct of a) a glycidyl compound having on average more than one epoxide group and b) a diol which contains

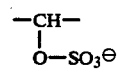

groups in the polymer chain.

The polyadducts are preferably based on glycidyl compounds having on average two epoxide groups in the molecule.

The glycidyl compounds can especially be those having two glycidyl groups, β-methylglycidyl groups or 2,3-epoxycyclopentyl groups bound to a heteroatom (for example sulfur, preferably oxygen or nitrogen); these can be in particular bis(2,3-epoxycyclopentyl)ether; diglycidyl ethers of polyhydric aliphatic alcohols such as 1,4-butanediol or polyalkylene glycols such as polypropylene glycols; diglycidyl ethers of cycloaliphatic polyols such as 2,2-bis(4-hydroxycyclohexyl)-propane; diglycidyl ethers of polyhydric phenols such as resorcinol, bis(p-hydroxyphenyl)methane, 2,2-bis(p-hydroxyphenyl)propane(=diomethane), 2,2-bis(4'-hydroxy-3',5'-dibromophenyl)propane and 1,3-di(p-hydroxyphenyl)ethane; di(β-methylglycidyl)ether; of the dihydric alcohols or dihydric phenols listed above; diglycidyl esters of dicarboxylic acids such as phthalic acid, terephthalic acid, Δ₄-tetrahydrophthalic acid and hexahydrophthalic acid; N,N-diglycidyl derivatives of primary amines and amides and heterocyclic nitrogen bases containing two N atoms, and N,N'-diglycidyl derivatives of disecondary diamides and diamines, such as N,N-diglycidylaniline, N,N-diglycidyltoluidine, N,N-diglycidyl-p-aminophenyl methyl ether and N,N'-dimethyl-N,N'-diglycidylbis(p-aminophenyl)methane; N',N''-diglycidyl-N-phenyl isocyanurate; N,N'-diglycidylethyleneurea; N,N'-diglycidyl-5,5-dimethylhydantoin, N,N'-diglycidyl-5-isopropylhydantoin, N,N-methylenebis(N',N'-diglycidyl-5,5-dimethyl-hydantoin), 1,3-bis(N-glycidyl-5,5-dimethylhydantoin)-2-hydroxypropane; and N,N'-diglycidyl-5,5-dimethyl-6-isopropyl-5,6-dihydrouracil.

The glycidyl compounds can be reacted with aliphatic, cycloaliphatic or aromatic diols to give the preferred polyadducts, a secondary alcohol group which can be sulfated being formed by addition to the glycidyl group.

The glycidyl compounds can, however, also be reacted by polyaddition, to give linear polyadducts, with primary aliphatic, cycloaliphatic or aromatic monoamines (for example aniline, toluidine, $C_1$-$C_{12}$alkylamines and $C_2$-$C_{12}$hydroxyalkylamines), aliphatic, cycloaliphatic or aromatic dicarboxylic acids (for example maleic acid, adipic acid, trimethyladipic acid, sebacic acid, azelaic acid, succinic acid, dodecylsuccinic acid, phthalic acid, terephthalic acid, $\Delta_4$-tetrahydrophthalic acid, hexahydrophthalic acid, 4-methylhexahydrophthalic acid, 3,6-endomethylene-$\Delta_4$-tetrahydrophthalic acid and 4-methyl-3,6-endomethylene-$\Delta_4$-tetrahydrophthalic acid) or aliphatic, cycloaliphatic, heterocyclic or aromatic bis-secondary amines or bis-secondary carboxamides (for example N,N'-dimethylethylenediamine, N,N'-dimethylpropylene-1,3-diamine, N,N'-dimethylhexamethylenediamine, N,N'-dicyclohexylhexamethylenediamine, N,N',N''-trimethyldiethylenetriamine, N,N'-diethylpropylene-1,3-diamine, N-methyl-3,5,5-trimethyl-3-(methylaminomethyl)cyclohexylamine, N,N'-dimethylated or -diethylated aromatic diamines, for example m- or p-phenylenediamine, bis(4-aminophenyl)methane or bis(4-aminophenyl) sulfone, 2,2-bis(4-aminophenyl)propane, N,N-dimethyl-m-xylylenediamine, and also ethyleneurea, 5,5-dimethylhydantoin, 5-isopropylhydantoin, N,N-methylenebis-5,5-dimethylhydantoin, 1,3-bis(5,5-dimethyl)-2-hydroxypropane and 5,5-dimethyl-6-isopropyl-5,6-dihydrouracil).

A moulding composition according to the invention is preferred in which the polyadduct comprises, relative to the polyadduct, a) 100 to 5 mol % of identical or different structural units of the formula I

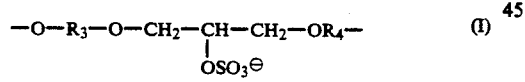

and b) 95 to 0 mol % of identical or different structural units of the formula II

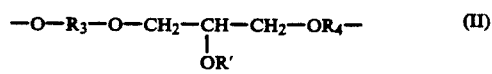

$R_3$ and $R_4$ independently of one another being the radical of a diol, having aliphatic or aromatic diol groups, minus two hydroxyl groups, and R' being H, $C_1$-$C_{20}$alkyl, $C_1$-$C_{20}$acyl or aminocarbonyl N-substituted by a $C_1$-$C_{20}$hydrocarbon radical.

Preferably 90 to 20 and particularly preferably 30 to 80 mol % of structural units of the formula I and 80 to 10 and particularly preferably 70 to 20 mol % of structural units of the formula II are present.

In a preferred embodiment, $R_3$ and $R_4$ are identical radicals. A radical $R_3$ or $R_4$ with aliphatic diol groups preferably contains 2 to 12 and especially 2 to 8 C atoms. The hydroxyl groups can be bound to open-chain radicals or cyclic aliphatic radicals.

Examples of aliphatic radicals are linear or branched $C_2$-$C_{12}$alkylene, $C_3$-$C_8$cycloalkylene, $C_1$-$C_4$alkyl-$C_5$-$C_8$cycloalkylene, cyclohexylmethylene or cyclohexyldimethylene. Examples are ethylene, 1,2- or 1,3-propylene, 1,2-, 1,3- or 1,4-butylene, 1,2-, 1,3-, 1,4- or 1,5-pentylene, 1,2-, 1,3-, 1,4-, 1,5- or 1,6-hexylene, heptylene, octylene, nonylene, decylene, undecylene, dodecylene, 1,3-cyclopentylene, 1,3- or 1,4-cyclohexylene, 2-methyl-1,4-cyclohexylene and cyclohexyl-1,4-dimethylene.

The aromatic diol groups of the diols used for the polyadducts are in particular phenolic groups. The diol radicals with phenolic groups preferably contain 6-30 and particularly preferably 6-20 C atoms. A preferred embodiment is represented by compositions in which $R_3$ and $R_4$ independently of one another are a radical of the formula III

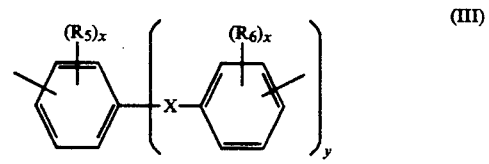

in which X is a direct bond, $C_1$-$C_4$alkylene, $C_2$-$C_{12}$alkylidene, $C_5$-$C_8$cycloalkylidene, —O—, —S—, —SO—, —SO$_2$—, —CO—, —CO$_2$—, —N($C_1$-$C_4$alkyl)— or —Si(CH$_3$)$_2$—, $R_5$ and $R_6$ independently of one another are H, halogen, $C_1$-$C_4$alkyl or $C_1$-$C_4$alkoxy, x is 1 or 2 and y is 0 or 1.

X is preferably a direct bond, methylene, ethylene, $C_2$-$C_6$alkylidene, cyclohexylidene or cyclopentylidene, —O— or —S—. $R_5$ and $R_6$ are preferably H or methyl and y is preferably 1.

In particular, $R_3$ and $R_4$ are the radical

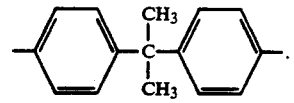

A moulding composition according to the invention is also preferred in which the thermoplastic polymer is an at least partially sulfated homo- or co-polymer of acrylates or methacrylates having a

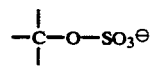

group in the ester group. Such a composition is more preferred in which the polymer comprises, relative to the polymer, a) 100 to 5 mol % of identical or different strutural units of the formula IV.

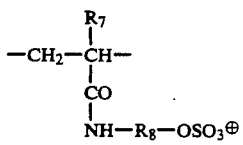 (IV)

and
b) 95 to 0 mol % of identical or different structural units of the formula V

 (V)

in which $R_7$ is H or methyl, $R_8$ is linear or branched $C_2-C_{18}$alkylene, poly($C_2-C_6$oxaalkylene) having 2 to 6 oxaalkylene units, $C_5-C_8$cycloalkylene, phenylene, benzylene, xylylene or the group

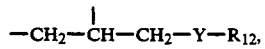

Y is —O—,

or —N($C_1-C_4$alkyl)— and $R_{12}$ is $C_1-C_{18}$alkyl, $C_5-C_7$cycloalkyl, ($C_1-C_{12}$alkyl)-$C_5-C_7$cycloalkyl, phenyl, ($C_1-C_{12}$alkyl)phenyl, benzyl or ($C_1-C_{12}$alkyl)benzyl, $R_9$ is H, $C_1-C_6$alkyl, —COOR$_{12}$ or —COO$^\ominus$, $R_{10}$ is H, F, Cl, CN or $C_1-C_6$alkyl and $R_{11}$ is H, F, Cl, CN, $R_{12}$—O—, $C_1-C_{12}$alkyl, —COO$^\ominus$, —COOR$_{12}$, —COAR$_8$—OH, —OCO—R$_{12}$ or phenyl, $R_8$ and $R_{12}$ being as defined above and A being —O— or —NH—. A is preferably —NH—.

Preferably, 90 to 20 and particularly preferably 80 to 30 mol % of structural units of the formula IV and 80 to 10 and particularly preferably 70 to 20 mol % of structural units of the formula V are present.

Alkylene $R_8$ preferably contains 2 to 12, particularly preferably 2 to 8 and especially preferably 2 to 6 C atoms. Examples are ethylene and the isomers of propylene, butylene, pentylene, hexylene, heptylene, octylene, nonylene, decylene, undecylene, dodecylene, tetradecylene, hexadecylene and octadecylene. Ethylene, 1,2- and 1,3-propylene, 1,2-, 1,3- and 1,4-butylene, 1,2-, 1,3, -, 1,4- and 1,5-pentylene and 1,2-, 1,3-, 1,4-, 1,5- and 1,6-hexylene are preferred.

Poly(oxaalkylene) $R_8$ preferably contains 2 to 4 oxaalkylene units and preferably 2 to 4, particularly preferably 2 or 3, C atoms in the alkylene radical.

Cycloalkylene $R_8$ is in particular cyclopentylene or cyclohexylene.

The group

as $R_8$ represents reaction products of glycidyl poly- or copoly(meth)acrylates with an H-active compound $R_{12}$—Y—H.

Y is preferably —O— or

$R_{12}$ can be linear or branched $C_1-C_{18}$alkyl, preferably $C_1-C_{12}$alkyl and especially $C_1-C_6$alkyl. Cycloalkyl $R_{12}$ is especially cyclopentyl or cyclohexyl. In ($C_1-C_{12}$alkyl)cycloalkyl $R_{12}$, cycloalkyl is especially cyclopentyl or cyclohexyl and the alkyl group can be linear or branched and preferably contains 1 to 6, especially 1 to 4, C atoms. In alkylphenyl or alkylbenzyl $R_{12}$, the alkyl group can be linear or branched and preferably contains 1 to 6, especially 1 to 4, C atoms.

$R_9$ is preferably H. Alkyl $R_9$ is preferably methyl or ethyl. In —COOR$_{12}$ as $R_9$, $R_{12}$ is preferably $C_1-C_{12}$alkyl and especially $C_1-C_6$alkyl.

Alkyl $R_{10}$ is preferably $C_1-C_4$alkyl, for example methyl, ethyl, n-propyl and n-butyl. Preferably, $R_{10}$ is H, Cl or $C_1-C_4$alkyl.

In the group $R_{12}$—O— as $R_{11}$, $R_{12}$ is preferably $C_1-C_{12}$alkyl and especially $C_1-C_6$alkyl. Alkyl $R_{11}$ contains preferably 1 to 6, especially 1 to 4, C atoms. In the group —COOR$_{12}$ as $R_{11}$, $R_{12}$ is preferably $C_1-C_{12}$alkyl, especially $C_1-C_6$alkyl, cyclopentyl or cyclohexyl. In the group —CCO—R$_{12}$ as $R_{11}$, $R_{12}$ is preferably $C_1-C_{12}$alkyl, especially $C_1-C_6$alkyl, phenyl or benzyl.

The preferred definitions given above for $R_8$ apply to the group —COOR$_8$OH as $R_{11}$.

In a preferred embodiment, $R_9$ is H, $R_{10}$ is H, F, Cl, methyl or ethyl and $R_{11}$ is F, Cl, CN, $C_1-C_4$alkyl, $C_1-C_6$alkoxy, —COO—$C_1-C_6$alkyl, —COO—R$_8$—OH, —OOC—$C_1-C_6$alkyl or phenyl.

$C_1-C_{20}$alkyl R' can be linear of branched. Acyl R' can, for example, be $C_1-C_{20}$alkyl-CO—, $C_5-C_8$cycloalkyl-CO—, $C_1-C_{15}$alkyl-$C_5-C_8$cycloalkyl-CO—, $C_5-C_8$cycloalkyl-CH$_2$-CO—, $C_1-C_{14}$alkyl-$C_5-C_8$cycloalkyl-CH$_2$—CO—, phenyl-CO—, benzyl-CO—, $C_1-C_{14}$alkylphenyl-CO— or -benzyl-CO. The hydrocarbon radical in the aminocarbonyl can, for example, be $C_1-C_{20}$alkyl, $C_5-C_8$cycloalkyl, $C_1-C_{15}$alkyl-$C_5-C_8$cycloalkyl, $C_5-C_8$cycloalkyl-CH$_2$, $C_1-C_{14}$alkyl-$C_5-C_8$cycloalkyl-CH$_2$, phenyl, benzyl, $C_1-C_{14}$alkylphenyl or $C_1-C_{14}$alkylbenzyl. R' is preferably H.

Those moulding compositions are particularly preferred in which, in the formula IV, $R_7$ is H or CH$_3$ and $R_8$ is linear or branched $C_2-C_6$alkylene, cyclopentylene or cyclohexylene and, in the formula V, $R_9$ is H, $R_{10}$ is H or methyl and $R_{11}$ is —COOR$_{12}$ or —COOR$_8$OH.

A further preferred embodiment is represented by moulding compositions in which the thermoplastic polymer is an at least partially sulfated polyvinyl alcohol or sulfated polyvinyl alcohol copolymer having groups

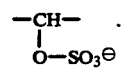

Sulfated polyvinyl alcohol copolymers are preferably present in the composition.

Those compositions are preferred in which the copolymer comprises
a) 90 to 5 mol % of structural units of the formula VI

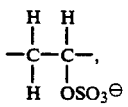

and b) 95 to 10 mol % of identical or different structural units of the formula V

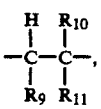

in which $R_9$, $R_{10}$ and $R_{11}$ are as defined above.

70 to 10 and especially 60 to 20 mol % of structural units of the formula VI and 30 to 90 and especially 40 to 80 mol % of structural elements of the formula V are preferred.

The above preferred definitions apply to $R_9$, $R_{10}$ and $R_{11}$ in the formula V.

Those moulding compositions are especially preferred in which $R_9$ and $R_{10}$ are H and $R_{11}$ is —OCOR$_{12}$, in which $R_{12}$ is $C_1$–$C_{18}$alkyl, $C_5$–$C_7$cycloalkyl, ($C_1$–$C_{12}$alkyl)-$C_5$–$C_7$cycloalkyl, phenyl, benzyl, ($C_1$–$C_{12}$alkyl)phenyl or ($C_1$–$C_{12}$alkyl)benzyl.

A preferred embodiment is represented by moulding compositions in which the thermoplastic polymer is a sulfated polyimide having structural elements of the formula VII

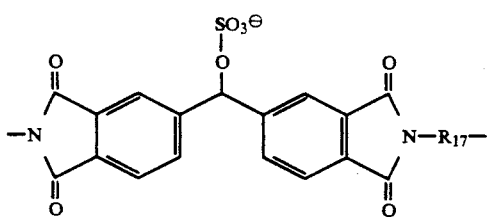

in which $R_{17}$ is unsubstituted or $C_1$–$C_6$alkyl- or $C_1$–$C_6$alkoxy-substituted $C_6$–$C_{12}$arylene or $C_5$–$C_8$cycloalkylene or is the radical

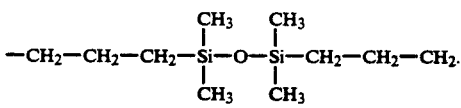

Another preferred embodiment is represented by moulding compositions in which the thermoplastic polymer is a sulfated polyamide having structural elements of the formula VIII

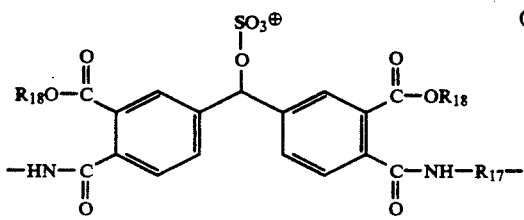

in which $R_{17}$ is unsubstituted or $C_1$–$C_6$alkyl-substituted or $C_1$–$C_6$alkoxy-substituted $C_6$–$C_{12}$arylene or $C_5$–$C_8$cycloalkylene or the radical

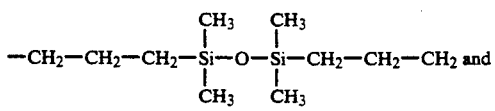

$R_{18}$ is $C_1$–$C_{12}$alkyl.

A further preferred embodiment is represented by moulding compositions, in which the thermoplastic polymer is a sulfated polymer of a partially hydroxylated polybutadiene or polyisoprene.

If the moulding composition contains more than one polyanion of a thermoplastic polymer having sulfated alcohol groups, binary or ternary mixtures are preferred.

The polyanions of component b) in the moulding composition according to the invention are derived from polymeric salts which are known or which can be prepared by processes known per se.

These are themoplastic polymers having sulfated alcohol groups

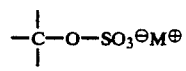

in recurring structural units, $M^\oplus$ being an alkali metal cation or ammonium cation. Such polymers are described, for example, in EP-A-0,358,188.

The ammonium cation can, for example, be $NH_4^\oplus$, a protonated primary, secondary or tertiary amine, or a quaternary ammonium or pyridinium. The primary ammonium can have 1 to 18 C atoms, particularly 1 to 12 and especially 1 to 6 C atoms, the secondary ammonium can have 2 to 24, particularly 2 to 12 and especially 2 to 8 C atoms, the tertiary ammonium can have 3 to 30, particularly 3 to 18 and especially 3 to 12 C atoms, and the quaternary ammonium can have 4 to 36, particularly 4 to 24 and especially 4 to 18 C atoms.

Those polymer salts are preferred in which $M^\oplus$ is $Li^\oplus$, $Na^\oplus$ or $K^\oplus$ or $M^\oplus$ is $R_{13}R_{14}R_{15}R_{16}N^\oplus$, in which $R_{13}$, $R_{14}R_{15}$ and $R_{16}$ independently of one another are H, unsubstituted or hydroxy-substituted $C_1$–$C_{18}$alkyl, phenyl, ($C_1$–$C_{12}$alkyl)phenyl, ($C_1$–$C_{12}$-alkyl)benzyl, $C_5$–$C_7$cycloalkyl or ($C_1$–$C_{12}$alkyl)-$C_5$–$C_7$cycloalkyl, or $R_{13}$ and $R_{14}$ together are tetramethylene, pentamethylene or 3-oxapentylene and $R_{15}$ and $R_{16}$ are as defined above. A preferred embodiment is represented by polymers in which at least one of $R_{13}$ to $R_{16}$ is other than H.

Alkyl $R_{13}$ to $R_{16}$ can be linear or branched and preferably have 1 to 12 and especially 1 to 6 C atoms. Examples are methyl, ethyl, n- and i-propyl, n-, i- and t-butyl, pentyl, hexyl, heptyl, octyl, nonyl, decyl, undecyl, dodecyl, tetradecyl, hexadecyl and octadecyl.

Hydroxyalkyl $R_{13}$ to $R_{16}$ can be linear or branched and preferably contains 2 to 18, particularly 2 to 12 and especially 2 to 6 C atoms. Some examples are 2-hydroxyeth-1-yl, 1- or 2-hydroxyprop-3-yl, 1-hydroxybut-4-yl and 1-hydroxyhex-6-yl.

Examples of alkylphenyl and alkylbenzyl are methylphenyl, dimethylphenyl, ethylphenyl, n- or i-propylphenyl, n-, i- or t-butylphenyl, hexylphenyl, octylphenyl, decylphenyl, dodecylphenyl and correspondingly alkylated benzyl radicals.

Cycloalkyl $R_{13}$ to $R_{16}$ are especially cyclopentyl or cyclohexyl.

Alkylcycloalkyl $R_{13}$ to $R_{16}$ is preferably ($C_1$–$C_{12}$alkyl)-cyclopentyl or -cyclohexyl, for example methyl- or ethyl-cyclopentyl or -cyclohexyl.

Particularly preferably, $R_{13}$ to $R_{16}$ are $C_1$–$C_6$alkyl.

The polymeric salts to be used according to the invention are known or can be prepared by generally known processes, hydroxyl groups in the monomers used being protected by customary protective groups, depending on the type of the polymers used and on the process conditions.

Polymeric salts having

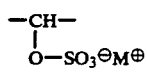

groups in the polymer chain, consisting of an at least partially sulfated polyadduct of a) a glycidyl compound having an average more than one, preferably two, epoxide groups and b) a diol, are preferred. Such polymeric salts are described, for example, in U.S. Pat. No. 3,402,221.

Polymeric salts consisting of an at least partially sulfated homo- or co-polymer of acrylates or methacrylates having a

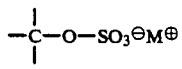

group in the ester group are described, for example, in U.S. Pat. No. 4,341,647 and U.S. Pat. No. 4,288,427.

Polysiloxanes having sulfated hydroxyalkyl groups in the form of salts are described, for example, in JP-A-180,690.

Polyimides and polyamides having hydroxyl groups are obtainable, for example, from keto-tetracarboxylic acids or -dicarboxylic acids by hydrogenation of the keto group before the polyimide formation. Thus, for example, benzophenone-3,4-carboxylic acid dianhydride can be converted into benzhydroltetracarboxylic acid dianhydride or acids or esters thereof.

To prepare sulfated polyesters, polyamides, polyimides and polyurethanes to be used according to the invention and containing hydroxyl groups, corresponding unsaturated polymers can first be prepared from unsaturated monomers, for example from unsaturated dicarboxylic acids such as maleic or fumaric acid, or alkenylenediols or alkenylenediamines, for example from 1,4-but-2-enediol or 1,4-but-2-enediamine. The double bonds in the polymers can then be epoxidised with peracids, as also in the case of polybutadiene, polyisoprene or chloroprene, and the epoxide ring can then be opened, for example by hydrolysis. The hydroxyl groups can then be sulfated, which is also applicable to the known polyvinyl alcohols and polyvinyl alcohol copolymers (cf., for example, M. L. Hallensleben in Houben-Weyl, Volume E20, pages 1994 et seq.).

Polymers containing hydroxyalkyl groups can also be obtained by reacting polymers having active H atoms, for example polyvinyl alcohol, polyamides, acrylic/methacrylic acid polymers or copolymers thereof, with ethylene oxide or propylene oxide.

The thermoplastic polymeric salts to be used according to the invention are obtainable in the known manner by reacting a thermoplastic polymer, which contains alcohol groups

in recurring structural units, with $SO_3$ in an inert solvent, then neutralising the reaction mixture with an alkali metal base or ammonium base and isolating the polymer.

The process is known per se. The $SO_3$ can be introduced, for example, as a gas into the reaction solution. Preferably, a pyridine/$SO_3$ complex is used which is commercially available.

Suitable inert solvents are especially polar aprotic solvents, the selection of the solvent depending mainly on the solubility of the polymers containing hydroxyl groups. The solvents can be used alone or as a mixture of at least 2 solvents. Examples are: ethers such as dibutyl ether, tetrahydrofuran, dioxane, methylene glycol, dimethylethylene glycol, dimethyldiethylene glycol, diethyldiethylene glycol and dimethyltriethylene glycol, halogenated hydrocarbons such as methylene chloride, chloroform, 1,2-dichloroethane, 1,1,1-trichloroethane and 1,1,2,2-tetrachloroethane, and lactones such as γ-butyrolactone, δ-valerolactone and pivalolactone, carboxamides and lactams such as N,N-dimethylformamide, N,N-diethylformamide, N,N-dimethylacetamide, N,N-diethylacetamide, N-methyl-γ-butryolactam, N-methyl-ε-caprolactam, N-methylpyrrolidone, N-acetylpyrrolidone, tetramethylurea, hexamethylphosphorotriamide, sulfoxides such as dimethyl sulfoxide, sulfones such as dimethyl sulfone, diethyl sulfone, trimethylene sulfone and tetramethylene sulfone, N-methylpyrrolidine, N-methylpiperidine, N-methylmorpholine and substituted benzenes such as benzonitrile, chlorobenzene, o-dichlorobenzene, 1,2,4-trichlorobenzene and nitrobenzene.

The reaction temperature is, for example, 10° to 150° C., preferably 20° to 100° C. The reaction time is about 5 to 10 hours. After the reaction has ended, neutralisation is effected, when using $SO_3$ gas, by means of an aqueous solution of alkali metal bases or ammonium hydroxide, or aqueous or organic solutions of amine hydroxides. If amine/$SO_3$ complexes are used, for example a pyridine/$SO_3$ complex, the corresponding ammonium salts are formed, which can be used directly or in which the ammonium groups can be replaced by stronger bases. The salts of the sulfated polymers are in general precipitated with water. The polymer is then filtered off and, for purification, can be washed with water or an organic non-solvent and then dried.

Polymeric salts of polyolefins can also be prepared by, for example, free-radical polymerisation of acrylates and methacrylates having —O—$SO_3M^\oplus$ radicals in the ester group, if appropriate together with olefin comonomers.

The polymeric salts, to be used according to the invention, of sulfated polymers containing hydroxyl groups have thermoplastic properties. Their glass transition temperature is substantially unchanged as compared with the starting polymers, and they are distinguished by their mechanical strength, for example by a high tensile and flexural strength and high flexibility. They are outstandingly suitable as polyanions for electrically conductive polycations of polyheteroaromatic compounds.

The moulding compositions according to the invention are prepared in a manner known per se by a) electrochemically polymerising a heteroaromatic compound or an aniline in an organic, aqueous-organic or aqueous solution in the presence of a polymeric salt and then removing the particles from the anode, or b) reacting a heteroaromatic compound or an aniline in the presence of a polymeric salt and an inert solvent with an oxidising agent.

Examples of suitable oxidising agents are peroxides and persulfates, especially $H_2O_2$, $K_2S_2O_8$ and $(NH_4)_2S_2O_8$, and also iron(III) compounds and copper-(II) compounds, especially $FeCl_3$ and $CuCl_2$.

The electrolysis can be carried out at constant potential or at constant current. Examples of suitable anode materials are inert metals (titanium, nickel, platinum or steel) or ITO glass, or else non-inert metals, for example aluminium (cf. DE-A-3,906,563). The current density can, for example, be 0.5–50, preferably 2 to 50 and particularly preferably 2 to 20 mA/cm². Brush electrodes are also a suitable anode material.

The concentration of polymeric salts can be 0.05 to 1 mol/l, preferably 0.01 to 0.5 mol/l, relative to the reaction mixture. The concentration of heteroaromatic compounds or an aniline can be 0.01 to 10% by volume, especially 0.1 to 5% by volume, relative to the volume of the reaction mixture.

Suitable organic solvents have been mentioned above. Preferred solvents are alcohols, for example alkanols having 1 to 12 C atoms, which can be substituted by $C_1$–$C_4$alkoxy. Examples are methanol, ethanol, n- and i-propanol, n-, i- and t-butanol, pentanol, hexanol, heptanol, octanol, decanol, dodecanol, methoxyethanol, ethoxyethanol, diethylene glycol monomethyl or monoethyl ether or 1-methoxypropan-2- or -3-ol.

The formation of pulverulent deposits on the electrode can be fixed by the electrolysis conditions and especially by the choice of solvent. The presence of polar protic solvents alone or as a mixture with polar solvents promotes the formation of powders.

A preferred embodiment of the process comprises carrying out the polymerisation in the presence of a polar protic solvent, preferably in the presence of alcohols, $M^\oplus$ being an ammonium cation having at least one organic group. In this case, $M^\oplus$ is especially $R_{13}R_{14}R_{15}R_{16}N^\oplus$, in which $R_{13}$ to $R_{16}$ independently of one another are unsubstituted or hydroxyl-substituted $C_1$–$C_{18}$alkyl, phenyl, ($C_1$–$C_{12}$alkyl)phenyl, ($C_1$–$C_{12}$alkyl)benzyl, $C_5$–$C_7$cycloalkyl or ($C_1$–$C_{12}$alkyl)-$C_5$–$C_7$cycloalkyl, or $R_{13}$ and $R_{14}$ together are tetramethylene, pentamethylene or 3-oxapentylene and $R_{15}$ and $R_{16}$ are as defined above. In particular, $R_{13}$ to $R_{16}$ are here $C_1$–$C_6$alkyl, for example methyl, ethyl, n-propyl and preferably n-butyl.

In the case of sufficient solubility of the reactants, the electrochemical polymerisation can also be carried out in water or an aqueous-organic solution. The additional use of buffers is expedient. Examples of suitable buffers are alkylammonium phosphates which have 1 to 3, especially 2 or 3, alkyl radicals in the ammonium group and which can contain 1 to 6, especially 1 to 4, C atoms. Examples are trimethyl-, triethyl-, tri-n-propyl- and tri-n-butyl-ammonium phosphate. Cation exchangers in their protonated form are also suitable buffers.

Further substances, which co-precipitate on the anode, for example anionic plasticisers or anionic dyes, can also be added to the reaction mixture.

After the end of the electrolysis, the moulding compositions according to the invention can be detached in the form of pulverulent deposits from the anode and purified by washing with solvents. The particle sizes of the powder can be, for example, from 1 to 5000 μm, preferably from 10 to 3000 μm. Depending on the electrolysis conditions, the particles have different shapes. These can be dendrites which may be intergrown, needles, small rods, fibers or drop-like particles.

The oxidation with iron(III) compounds can be carried out, for example, at temperatures from −20° C. to 60° C., preferably 0° C. to 40° C. Suitable solvents have been mentioned above in connection with the preparation of the polymeric salts. If the iron(III) compounds, for example iron salts, are insoluble in organic solvents, water-soluble solvents are advantageously used as a mixture with water. Suitable water-soluble solvents are in particular $C_1$–$C_{12}$alkanols, preferably $C_1$–$C_4$alkanols, which can be substituted by $C_1$–$C_4$alkoxy. Examples of alkanols have been mentioned above.

Examples of suitable iron(III) compounds are iron-(III) complexes or complex salts or especially iron(III) salts of inorganic and organic acids, for example HCl, HBr, HI, $H_2SO_4$, $HClO_4$, $HNO_3$, $FSO_3H$, $CF_3SO_3H$, acetic acid and propionic acid. Iron(III) halides, especially iron(III) chloride, are preferred. Apart from iron-(III) salts, other oxidising agents such as ammonium peroxodisulfate and Cu(II) salts can also be used.

The chemical oxidation method is described, for example, in Bull. Chem. Soc. Jpn. 62, pages 234–238 (1989). The reaction proceeds rapidly and the desired products precipitate as black powders which can be filtered off and purified by washing with, for example, water, NaOH or both agents. If ionic chloride is present, it can be removed by treating the powders with chlorosulfonic acid and subsequent washing with water. The grain size of the powder particles is, for example, from 0.1 μm to 100 μm, preferably from 1 μm to 10 μm.

In place of aniline, the corresponding polyphenyleneamine, which may be half-oxidised, for example poly(p-phenyleneamineimine) can also be used in the chemical oxidation.

If iron(III) salts are used, the powders show a small content of anions from the oxidising agent, even in the case of a large excess of iron(III) salts over the anionic groups in the polyelectrolyte. The moulding compositions according to the invention are black, free-flowing and electrically conductive powders having glass transition temperatures up to about 150° C., and mouldings of any desired three-dimensional shape can be produced from them by known moulding processes, including transfer moulding, with application of pressure. The invention also relates to the use of the moulding compositions according to the invention for producing electrically conductive mouldings, for example bars, plates, housings and other mouldings, which can be used for screening electromagnetic fields or as electrodes.

The moulding compositions can be processed at low temperatures to give sintered bodies which can be porous. When high pressure and elevated temperatures are applied, for example below the decomposition temperatures up to the range of the glass transition temperatures, preferably 60° C. to 150° C., the moulding compositions are surprisingly free-flowing. Under such processing conditions, compact mouldings having smooth surfaces and good mechanical properties, for example flexural strength, breaking strength, tensile strength, flexibility and toughness, are obtained.

The mouldings obtained from the moulding compositions according to the invention show high electrical conductivities which, in the case of polyheteroaromatic compounds, are in general above 0.1 S/cm. The conductivity can be influenced by heat-treating moulded products or by the pressure and/or the temperature during the moulding process. They also have valuable mechanical properties. Surprisingly, it has been found that the moulding compositions according to the invention have such low glass transition temperatures that processing by a thermoplastic shaping process, namely moulding processes, is possible even at a low polyanion content, without loss of the electrical conductivity.

The mouldings obtained from moulding compositions according to the invention can be used, for example, as electrical conductors, electrodes, cathodes for batteries, electromagnetic screening materials, electrically conductive bars, sensors, antistatic packaging material or electrically conductive sealing material.

The pulverulent moulding compositions can also be incorporated as electrically conductive fillers into polymers, for example in quantities from 0.1 to 90, preferably 5 to 80, % by weight relative to the plastic. Those skilled in the art are familiar with suitable plastics, for example from the field of thermosetting plastics, thermoplastics and structurally crosslinked polymers, and with incorporation methods and the use of, for example, processing aids, other fillers, colorants and stabilisers. The invention also relates to the use of the pulverulent moulding compositions as electrically conductive fillers for plastics. Mouldings produced from these filled plastics can, depending on the quantity of the electrically conductive filler, be used, for example, as electrical conductors or as components for screening electric and magnetic fields.

The invention also relates to a composition comprising a) a thermoplastic, thermosetting or structurally crosslinked polymer into which b) an electrically conductive, finely disperse filler of a1) at least one polyheteroaromatic compound or an aniline in the oxidised, polycationic form and b1) at least one polyanion of a thermoplastic polymer having sulfated alcohol groups

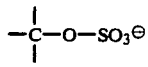

in recurring structural units.

The quantity of component b) can be 0.1 to 90% by weight, preferably 5 to 80% by weight, relative to component a). With a quantity of up to about 20% by weight, electrical conductivities are obtained which are suitable, for example, for an antistatic finish and for screening of electric fields. High electrical conductivities and, for example, mouldings suitable as electrical conductors are obtained with added quantities of more than 20% by weight, preferably at least 30% by weight.

Examples of suitable plastics are:

1. Polymers of monoolefins and diolefins, for example polypropylene, polyisobutylene, polybut-1-ene, polymethylpent-1-ene, polyisoprene or polybutadiene, as well as polymers of cycloolefins, for instance of cyclopentene or norbornene, and furthermore polyethylene (which can, if desired, be crosslinked), for example high-density polyethylene (HDPE), low-density polyethylene (LDPE) and linear low-density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low-density polyethylene (LLDPE) and its mixtures with low-density polyethylene (LDPE), propylene/but-1-ene, propylene/isobutylene, ethylene/but-1-ene, ethylene/hexene, ethylene/methylpentene, ethylene/heptene, ethylene/octene, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidenenorbornene; as well as mixtures of such copolymers and their mixtures with polymers mentioned in 1) above, for example polypropylene/ethylene-propylene copolymers, LDPE/ethylene-vinyl acetate copolymers, LDPE/ethylene-acrylic acid copolymers, LLDPE/ethylene-vinyl acetate copolymers and LLDPE/ethylene-acrylic acid copolymers.

3a. Hydrocarbon resins (for example $C_5$–$C_9$) and hydrogenated modifications thereof (for example tackifiers).

4. Polystyrene, poly-(p-methylstyrene), poly-(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/maleic anhydride and styrene/acrylonitrile/methyl acrylate; mixtures of high impact strength from copolymers of styrene and another polymer, for example a polyacrylate, a diene polymer or an ethylene/propylene/diene terpolymer; and block copolymers of styrene, for example styrene/butadiene/styrene, styrene/isoprene/styrene, styrene-ethylene/butylene-styrene or styrene-ethylene/propylene-styrene.

6. Graft copolymers of styrene or α-methylstyrene for example styrene on polybutadiene, styrene on polybutadiene-styrene or polybutadiene-acrylonitrile, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, as well as mixtures thereof with the copolymers listed under 5), for instance the mixtures known as ABS, MBS, ASA and AES polymers.

7. Halogen-containing polymers, such as polychloroprene, chlorinated rubber, chlorinated or chlorosulfonated polyethylene, copolymers of ethylene and chlorinated ethylene, epichlorohydrin homo-and copolymers, in particular polymers from halogen-containing vinyl compounds, for example polyvinyl chloride, polyvinylidene chloride, polyvinyl fluoride, polyvinylidene fluoride; as well as copolymers thereof, for example vinyl chloride/vinylidene chloride, vinyl chloride/vinyl acetate or vinylidene chloride/vinyl acetate copolymers.

8. Polymers which are derived from $\alpha,\beta$-unsaturated acids and derivatives thereof, such as polyacrylates and polymethacrylates, polyacrylamides and polyacrylonitriles.

9. Copolymers from the monomers mentioned under 8) with each other or with other unsaturated monomers, for example acrylonitrile/butadiene, acrylonitrile/alkyl acrylate, acrylonitrile/alkoxyalkyl acrylate or acrylonitrile/vinyl halide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; as well as their copolymers with olefins mentioned in 1) above.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and polyoxymethylenes which contain comonomers such as ethylene oxide; polyacetals modified with thermoplastic polyurethanes, acrylates or MBS.

13. Polyphenylene oxides and sulfides, and mixtures thereof with styrene polymers or polyamides.

14. Polyurethanes which are derived from polyethers, polyesters or polybutadienes with terminal hydroxyl groups on the one hand and aliphatic or aromatic polyisocyanates on the other hand, as well as precursors thereof.

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, 6/9, 6/12 and 4/6, polyamide 11, polyamide 12, aromatic polyamides obtained by condensation of m-xylylenediamine and adipic acid; polyamides prepared from hexamethylenediamine and isophthalic and/or terephthalic acid with or without an elastomer as modifier, for example poly-2,4,4-trimethylhexamethyleneterephthalamide or poly-m-phenyleneisophthalamide. Block copolymers of the aforementioned polyamides with polyolefins, olefin copolymers, ionomers or chemically bonded or grafted elastomers; or with polyethers, for example with polyethylene glycols, polypropylene glycols or polytetramethylene glycols. Further, polyamides or copolyamides modified with EPDM or ABS; and also polyamides condensed during processing (RIM-polyamide systems).

16. Polyureas, polyimides, polyamide-imides and polybenzimidazoles.

17. Polyesters which are derived from dicarboxylic acids and diols and/or from hydroxycarboxylic acids or the corresponding lactones, such as polyethylene terephthalate, polybutylene terephthalate, poly-1,4-dimethylocyclohexane terephthalate and polyhydroxybenzoates as well as block copolyether-esters derived from polyethers having hydroxyl end groups; and also polyesters modified with polycarbonates or MBS.

18. Polycarbonates and polyester-carbonates.

19. Polysulfones, polyether-sulfones and polyether-ketones.

20. Crosslinked polymers which are derived from aldehydes on the one hand and phenols, urea or melamine on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Crosslinkable acrylic resins, derived from substituted acrylic esters, such as epoxy-acrylates, urethane-acrylates or polyester-acrylates.

24. Alkyd resins, polyester resins or acrylate resins crosslinked with melamine resins, urea resins, polyisocyanates or epoxy resins.

25. Crosslinked epoxy resins which are derived from polyepoxides, for example from bis-glycidyl ethers or from cycloaliphatic diepoxides.

26. Natural polymers, such as cellulose, rubber, gelatine and derivatives thereof which are chemically modified in a polymer-homologous manner, such as cellulose acetates, cellulose propionates and cellulose butyrates, or cellulose ethers, such as methylcellulose; and rosins and their derivatives.

27. Mixtures (polyblends) of the polymers mentioned above, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, To improve the processing properties, the mechanical, electrical and thermal properties, the surface properties and the light stability, further additives, for example finely disperse fillers, reinforcing fillers, plasticisers, lubricants and mould release agents, adhesion promoters, antioxidants, heat stabilisers and light stabilisers, pigments and dyes can be incorporated into the composition according to the invention.

The composition according to the invention can be produced by processes known in plastics technology, for example by mixing the finely disperse, electrically conductive filler with the plastic before, during or after manufacture, by plasticising the plastic and mixing with the filler by means of calendering, kneading, extruding or injection-moulding for the production of granules or mouldings. It is also possible to mix plastics powder dry with the filler or to suspend the filler in a plastics solution and then to remove the solvent.

In the case of thermosetting plastics and structurally crosslinked polymers, the finely disperse filler is advantageously added before shaping and before curing or crosslinking, for example by combined mixing of the plastics components with the filler, in which case the latter can be incorporated beforehand into one component.

The composition according to the invention is a valuable moulding composition for the production of antistatically finished and electrically conductive mouldings of any type, for example films, sheets, tapes, fibres, plates, semifinished products, mouldings and housings for applications such as were mentioned above for the moulding compositions. The processes customary for plastics processing can here be applied, for example calendering, injection-moulding, transfer moulding, extrusion, thermoforming, pressing and sintering processes.

The finely disperse, electrically conductive filler is thermoplastically deformable, especially during processing under pressure and at elevated temperature. Such processing methods are therefore preferred, since a higher electrical conductivity can in general be achieved in this way. The compatibility with the base polymers can be influenced via the selection of the sulfated polyanion. Polyanions having functional groups, for example hydroxyl groups, can lead to crosslinking with corresponding base polymers (for example epoxy resins). Coupled with good mechanical properties, the mouldings show high and permanent electrical conductivities which in general are at least 0.01 S/cm when polyheteroaromatic compounds are used as the polycation. The conductivity can be increased by a thermal aftertreatment of the mouldings.

The invention also relates to the use of the composition according to the invention for the production of electrically conductive mouldings.

The examples which follow explain the invention in more detail. The conductivity is measured by the four-point method. Percentage data are percent by weight, unless stated otherwise.

A) PREPARATION EXAMPLES OF POLYMERS WITH SULFATE GROUPS IN SALT FORM

Example A1

Persulfated phenoxy resin. 142 g (0.5 mol) of phenoxy resin (polymeric adduct of bisphenol-diglycide and bisphenol A, molecular weight 28,000, made by Union Carbide, Type PKHH) are dissolved in 750 ml of DMF. 0.55 mol (87.5 g) of pyridine-$SO_3$ complex is then added. After 2 hours at 50° C., the mixture is cooled to below 10° C., and 22 g of NaOH dissolved in 150 ml of ethanol are slowly added dropwise. The pyridine is then evaporated off under reduced pressure. The polymer solution is precipitated in 6 l of isopropanol, and the polymer is filtered off and dried in vacuo. Yield: 190 g (98% of theory).

Example A2

Partially sulfated phenoxy resin. 142 g (0.5 mol) of phenoxy resin according to Example A1 are dissolved in 750 ml of DMF. After the addition of 26.5 g (0.16 mol) of pyridine-$SO_3$ complex, the mixture is stirred for 2 hours at 50°, then cooled to below 10° C. and neutralised with tributylamine. The pyridine is stripped off under reduced pressure. The polymer is precipitated in 10 l of water, filtered, washed and dried. Yield: 180 g (96% of theory).

Example A3

Persulfated ethylene/vinyl alcohol copolymer. 25 g of a fully saponified copolymer of ethylene and vinyl acetate having 4.12 mol of hydroxyl groups per kg of copolymer are dissolved at 65° C. in a 1:1 xylene/N-methylpyrrolidone mixture. The solution is allowed to cool to 40° C., and 0.05 mol of pyridine-$SO_3$ complex suspended in the solvent mixture is added. After stirring for 2 hours, a clear viscous solution is obtained which is cooled to below 10° C. and neutralised with tetraethylammonium hydroxide. The pyridine is stripped off under reduced pressure, and the polymer is precipitated with diethyl ether, filtered, washed and dried. This gives a copolymer —$(CH_2—CH_2)_n$—[$CH_2$—CH-($OSO_3R$]$_o$— with R being tetraethylammonium, $n/n+o=0.7$ and $o/n+o=0.3$. Two melting points at 90.5° C. and 225° C. are detected by differential thermal analysis.

Example A4

Sulfation of partially saponified polyvinyl acetate. 20 g of a polyvinyl acetate saponified to a degree of 88% are dissolved in 200 ml of N-methylpyrrolidone. A solution of 20.1 g of pyridine-$SO_3$ complex in 230 ml of N-methylpyrrolidone is then added in portions with stirring, and stirring is continued for a further 4 hours. The clear viscous solution is allowed to drip into diethyl ether, and the precipitated polymer is filtered off and dried (Yield 82%).

Example A5

According to Example A4, a polymer —[$CH_2$—CH(OH)]$_2$—[$CH_2$—CH($OSO_3R$)]$_1$— with R being tributylammonium and having melting points of 93.5° C. and 279° C. is obtained.

B) APPLICATION EXAMPLES

Example B1

10 g (0.0259 mol) of polymer according to Example A1 are dissolved in a mixture of 135 ml of ethoxyethanol and 15 ml of water. After the addition of 5.2 g (0.077 mol) of pyrrole, a solution of 34.1 g (0.21 mol) of $FeCl_3$ in 30 ml of water is added dropwise at 10° C. The solution assumes a black colour within a short time. The precipitated powder is filtered off, washed repeatedly in water and dried in vacuo. Yield: 13.2 g (91% of theory). The conductivity of a moulding (1 cm diameter pill, pressing pressure 1 G-pascal) is 2.45 S/cm.

Examples B2–B5

The procedure followed is analogous to Example B1, but the ethoxyethanol/water ratio is varied. The results are shown in the following table:

| Example No. | Ethoxyethanol (ml) | Water (ml) | Yield (%) | Conductivity (S/cm) |
| --- | --- | --- | --- | --- |
| B2 | 100 | 0 | 46 | 3.9 |
| B3 | 135 | 15 | 91 | 2.45 |
| B4 | 35 | 135 | 88 | 5.9 |
| B5 | 75 | 75 | 85 | 6.6 |

Example B6

A solution of 117 g of polymer according to Example A2, 50 ml of pyrrole and 20 ml of water is electrolysed for three hours at a current density of 3 mA/cm$^2$ in a drum-type reactor consisting of a rotatable roll (anode) and a cylindrical cathode. The pulverulent deposit (dendrites) is removed mechanically from the anode. At a processing temperature of 110° C., a mechanically stable moulding (square, 4×4×0.5 cm) is produced from the powder at 1 G-pascal. The conductivity is 7 S/cm.

Example B7

Oxidation with $(NH_4)_2S_2O_8/FeCl_3$. 3.05 g of polymer according to Example A3 are dissolved at 120° C. in 30 ml of methoxypropanol. After cooling, 10 ml of water and 2.01 g (30 mmol) of pyrrole are added and the mixture is cooled to below 10° C. With vigorous stirring, a solution of 10.47 g (45 mmol) of ammonium peroxodisulfate and 200 mg of FeCl₃ in 60 ml of water is added dropwise. This gives a black powder, yield 69%. A pill pressed according to Example B1 has a conductivity of 2.9 S/cm.

Example B8

25 g of powder according to Example B5 are filled into a preheated mould and pressed at 180° C. under pressure (1 GPa) for 3, 4 and 5 minutes to give a plate (12×12×0.2 cm). The results are shown in the following table:

| Pressing time (minutes) | Conductivity (S/cm) |
|---|---|
| 3 | 1.933 |
| 4 | 2.663 |
| 4 | 3.523 |
| 5 | 7.393 |
| 5 | 6.333 |

Example B9

According to Example B8, plates are pressed under the following conditions:
a) at room temperature,
b) at 180° C., and
c) the plate according to a) is heat-treated for 10 minutes at 180° C.

The result is shown in the following table:

| Experiment | Conductivity (S/cm) |
|---|---|
| a) | 2.9 |
| b) | 17.0 |
| c) | 10.19 |

Example B10

12 g (26.5 mmol) of polymer according to Example A5 and 6.3 ml (70 mmol) of aniline are dissolved in 100 ml of water and 5 ml of phosphoric acid (85%) are added. The mixture is then cooled to 5° C. and a solution of 4 g (17.5 mmol) of (NH₄)₂S₂O₈ in 50 ml of water is allowed to drip in with stirring. After an induction period of about 10 minutes, the colourless reaction mixture changes to blue-green. Stirring is continued for a further 4 hours, and the precipitate is filtered off and washed with slightly acidified water. This give 2.5 g of a deep green powder. The electrical conductivity of a pressed pill is 0.015 S/cm.

Example B11

1.5 g (13.3 mmol) of polymer according to Example A4 are dissolved in 80 ml of water with vigorous stirring, and hydrochloric acid, phosphoric acid or sulfuric acid is added to the solution until a pH of about 1 to 2 is reached. 100 mg (0.276 mmol) of emeraldine base are then added. After a short time, the suspension changes its colour via green to black. The mixture is stirred for 3 days at room temperature, the precipitate is filtered off and washed with slightly acidified water and the powder is dried for 2 days at room temperature in a high vacuum. The conductivity of a pressed pill and the glass transition temperature (differential thermal analysis) are shown in the following table:

| Acid added | Conductivity (S/cm) | Glass transition temperature (°C.) |
|---|---|---|
| HCl | 0.089 | 210 |
| H₃PO₄ | 0.079 | 207 |
| H₂SO₄ | 0.097 | 212 |

Example B12

500 mg of polymer according to Example A4 or 1 g of polymer according to Example A5 are dissolved in 6 ml of water and the solution is adjusted with phosphoric acid to pH 1 to 2. 100 mg (1.1 mmol) of leucoemeraldine are then added and the grey suspension is stirred for 2 hours at room temperature. The mole equivalents indicated below of H₂O₂ are added dropwise to the suspension which is then stirred for 4 days at room temperature. The black product which has precipitated is filtered off and dried. The dependence of the conductivity of a pressed pill on the added quantity of H₂O₂ is shown in the following table (Tg=glass transition temperature):

| Mole equivalents of H₂O₂ | Conductivity (S/cm) with polymer from | |
|---|---|---|
| | Example A4 (Tg 170° C.) | Example A5 (Tg 218° C.) |
| 1.00 | 0.038 | 0.0014 |
| 0.75 | 0.020 | 0.0031 |
| 0.50 | 0.00084 | 0.0035 |
| 0.25 | — | 0.00085 |

Example B13

60% by weight of the phenoxy resin used in Example A1 and 40% by weight of the powder according to Example B1 are intimately mixed mechanically. The mixture is pressed in a heated press at 110° C. to give a mechanically stable moulding. The conductivity is 0.034 S/cm.

Example B14

The powder according to Example B5 is mixed with a thermoplastic polymer powder in a ball mill, filled into a preheated mould and pressed under pressure at 180° to 200° C. for 5 minutes to give a plate. The respective quantities and conductivities are shown in the following table:

| % by weight of the thermoplastic polymer powder | % by weight of powder according to Example B5 | Conductivity (S/cm) |
|---|---|---|
| 95 PVC | 5 | 0.023 |
| 90 PVC | 10 | 0.143 |
| 85 PVC | 15 | 0.503 |
| 80 PVC | 20 | 0.853 |
| 75 PVC | 25 | 0.853 |
| 70 PVC | 30 | 1.803 |
| 65 PVC | 35 | 1.803 |
| 60 PVC | 40 | 2.303 |
| 55 PVC | 45 | 2.533 |
| 65 PE | 35 | 1.113 |
| 65 PP | 35 | 0.783 |

PVC: low molecular weight, made by EGA; PE: Hostalen GF7740, PP: PP-PIV 29, Amoco.

Example B15

35% by weight of the powder according to Example B5 are dissolved with stirring in a solution of a thermoplastic polymer in methylene chloride or tetrahydrofuran, and the polymer is precipitated by addition of methanol. The precipitate is filtered off and dried, and the powder obtained is pressed to give a plate. The polymers used and the conductivity are shown in the following table:

| Thermoplastic polymer | Conductivity (S/cm) |
| --- | --- |
| Polystyrene (165N) | 0.143 |
| ABS (Teluran 8775) | 0.033 |
| Polycarbonate (Type 5905) | 0.013 |
| Polyaryl (Ardel D-100, Amoco) | 0.093 |
| Polysulfone (Victrex 4800P) | 0.043 |

Example B16

Polyethylene (Statoil 620, Solvay) is first introduced into a kneader (Brabender Plasticorder) preheated to 180° C. and mixed in the melt with the powder according to Example B5. The mass thus obtained is pressed in a heated press under pressure at 190° C. to give plates. The added quantities and the conductivities are shown in the following table:

| % by weight of powder according to Example B5 | Conductivity (S/cm) |
| --- | --- |
| 60 | 0.07 |
| 50 | 0.02 |
| 40 | 0.003 |
| 30 | 0.0004 |

Example B17

The powder according to Example B5 and an epoxy-novolak together with a novolak curing agent are cured in a ball mill and then under pressure for 3 minutes in a press mould heated to 180° C. The added quantities and conductivities are shown in the following table:

| % by weight of powder according to Example B5 | Conductivity (S/cm) |
| --- | --- |
| 30 | 0.573 |
| 50 | 0.073 |
| 60 | 0.443 |
| 70 | 0.603 |
| 80 | 0.663 |
| 85 | 0.133 |

Example B18

Following the procedure of Example B17, a bisphenol A diglycidyl ether (epoxide equivalent weight 1588) advanced with bisphenol A is mixed with a curing agent and the powder according to Example B5, pressed to give a pill and cured at 150° C. Further data are to be found in the following table:

| % by weight of powder according to Example B5 | g of glydidyl ether | g of curing agent | Conductivity (S/cm) |
| --- | --- | --- | --- |
| 30 | 80.5 | 2.0 A | 0.3 |
| 50 | 73.2 | 1.5 B | 0.6 |
| 60 | 73.7 | 1.3 B | 0.2 |
| 70 | 80.4 | 2.0 A | 0.2 |
| 80 | 75.0 | 0.03 C | 0.4 |
| 85 | 75.6 | 5.0 D, 1.5 | 0.9 |

A = Bis(diaminodiphenyl)methane
B = 2-Methylimidazole
C = BF$_3$-Diethyl etherate
D = 5-(2',5'-dioxotetrahydrofuryl)-3-methylcyclohexane-1,2-dicarboxylic acid anhydride.

What is claimed is:

1. A moulding composition in the form of a free-flowing powder consisting of particles of a) at least one polyheteroaromatic compound or an aniline in the oxidised, polycationic form and b) at least one polyanion of a thermoplastic polymer having sulfated alcohol groups

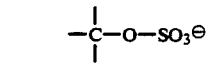

in recurring structural units.

2. A moulding composition according to claim 1, wherein the polyheteroaromatic compound is formed from 5- or 6-membered rings which contain 1 to 3 heteroatoms from the group comprising O, S and N and whose C atoms are unsubstituted or substituted by C$_1$–C$_{16}$alkyl.

3. A moulding composition according to claim 2, wherein the 5- or 6-membered ring is selected from the group comprising pyrrole, thiophene, furan, 2,2'-bipyrrole, 2,2'-bithiophene, 2,2'-bifuran, thiazole, oxazole, thiadiazole and imidazole.

4. A moulding composition according to claim 2, wherein the polyheteroaromatic compound is formed from a pyrrole of the formula

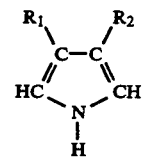

in which R$_1$ and R$_2$ independently of one another are H or C$_1$–C$_{16}$alkyl or C$_1$–C$_{16}$alkoxy, or R$_1$ and R$_2$ together are trimethylene or tetramethylene.

5. A moulding composition according to claim 1, which comprises 0.1–0.5 of a structural unit having sulfated alcohol groups

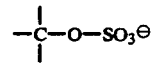

per structural unit of the polyheteroaromatic compound.

6. A moulding composition according to claim 5, which comprises 0.2 to 0.4 of a structural unit having sulfated alcohol groups.

7. A moulding composition according to claim 1, wherein the thermoplastic polymer in the form of salts of sulfated alcohol groups

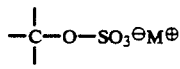

has a Tg from $-100°$ to $350°$ C., and $M^{\oplus}$ is an alkali metal cation or ammonium cation.

8. A moulding composition according to claim 7, wherein the Tg is $-50°$ to $250°$ C.

9. A moulding composition according to claim 1, wherein the ratio of free alcohol groups to sulfated alcohol groups

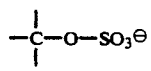

in the thermoplastic polymer is 50:1 to 1:50.

10. A moulding composition according to claim 9, wherein the ratio is 10:1 to 1:10.

11. A moulding composition according to claim 1, wherein the particle size is 1 to 5000 μm.

12. A moulding composition according to claim 1, wherein the thermoplastic polymer is an at least partially sulfated polyadduct of a) a glycidyl compound having on average more than one epoxide group and b) a diol containing

groups in the polymer chain.

13. A moulding composition according to claim 12, wherein the polyadduct comprises, relative to the polyadduct, a) 100 to 5 mol % of identical or different structural units of the formula I

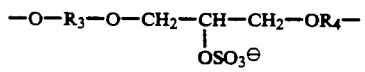

and b) 95 to 0 mol % of identical or different structural units of the formula II

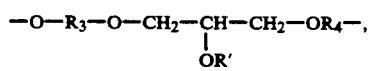

$R_3$ and $R_4$ independently of one another being the radical of a diol, having aliphatic or aromatic diol groups, minus two hydroxyl groups, and R' being H, $C_1$-$C_{20}$alkyl, $C_1$-$C_{20}$acyl or aminocarbonyl substituted by a $C_1$-$C_{20}$hydrocarbon radical.

14. A moulding composition according to claim 13, wherein $R_3$ and $R_4$ independently of one another are a radical of the formula III

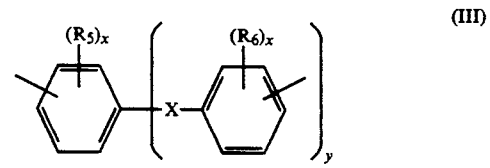

in which X is a direct bond, $C_1$-$C_4$alkylene, $C_2$-$C_{12}$alkylidene, $C_5$-$C_8$cycloalkylidene, —O—, —S—, —SO—, —SO$_2$—, —CO—, —CO$_2$—, —N($C_1$-$C_4$alkyl)— or —Si(CH$_3$)$_2$—, $R_5$ and $R_6$ independently of one another are H, halogen, $C_1$-$C_4$alkyl or $C_1$-$C_4$alkoxy, x is 1 or 2 and y is 0 or 1.

15. A moulding composition according to claim 14, wherein $R_3$ and $R_4$ are the radical

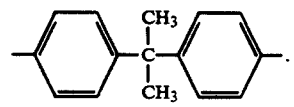

16. A moulding composition according to claim 1, wherein the thermoplastic polymer is an at least partially sulfated homo- or co-polymer of acrylates or methacrylates having a

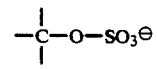

group in the ester group.

17. A moulding composition according to claim 16, wherein the polymer comprises, relative to the polymer, a) 100 to 5 mol % of identical or different structural units of the formula IV

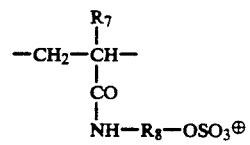

and b) 95 to 0 mol % of identical or different structural units of the formula V

in which $R_7$ is H or methyl, $R_8$ is linear or branched $C_2$-$C_{18}$alkylene, poly($C_2$-$C_6$oxaalkylene) having 2 to 6 oxaalkylene units, $C_5$-$C_8$cycloalkylene, phenylene, benzylene or xylylene or the group

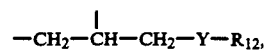

Y is —O—,

or —N($C_1$–$C_4$alkyl)—, and $R_{12}$ is $C_1$–$C_{18}$alkyl, $C_5$–$C_7$cycloalkyl, ($C_1$–$C_{12}$alkyl)-$C_5$–$C_7$cycloalkyl, phenyl, ($C_1$–$C_{12}$alkyl)phenyl, benzyl or ($C_1$–$C_{12}$alkyl)benzyl, $R_9$ is H, $C_1$–$C_6$alkyl, —COO$R_{12}$ or —COO$^\ominus$, $R_{10}$ is H, F, Cl, CN or $C_1$–$C_6$alkyl and $R_{11}$ is H, F, Cl, CN, $R_{12}$—O—, $C_1$–$C_{12}$alkyl, —COO$^\ominus$, —COO$R_{12}$, —COO$R_8$—OH, —CONH-$R_8$—OH, —OCO—$R_{12}$ or phenyl, $R_8$ and $R_{12}$ being as defined above.

18. A moulding composition according to claim 17, wherein, in the formula IV, $R_7$ is H or $CH_3$ and $R_8$ is linear or branched $C_2$–$C_6$alkylene, cyclopentylene or cyclohexylene and, in the formula V, $R_9$ is H, $R_{10}$ is H or methyl and $R_{11}$ is —COO$R_{12}$ or —COO$R_8$OH.

19. A moulding composition according to claim 1, wherein the thermoplastic polymer is a sulfated polyimide having structural elements of the formula VII

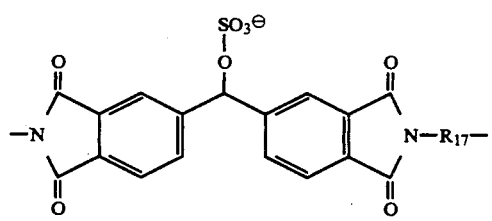

in which $R_{17}$ is unsubstituted or $C_1$–$C_6$alkyl-substituted or $C_1$–$C_6$alkoxy-substituted $C_6$–$C_{12}$arylene or $C_5$–$C_8$cycloalkylene or is the radical

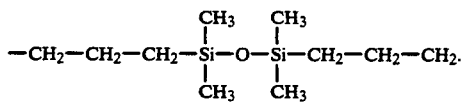

20. A moulding composition according to claim 1, wherein the thermoplastic polymer is a sulfated polyamide having structural elements of the formula VIII

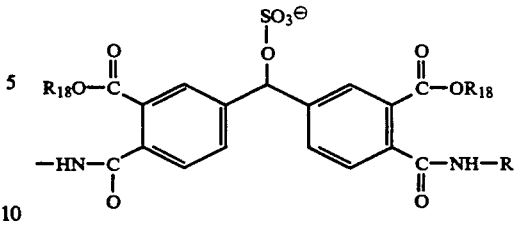

in which $R_{17}$ is unsubstituted or $C_1$–$C_6$alkyl-substituted or $C_1$–$C_6$alkoxy-substituted $C_6$–$C_{12}$arylene or $C_5$–$C_8$cycloalkylene or is the radical

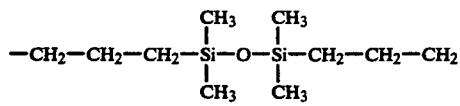

and $R_{18}$ is $C_1$–$C_{12}$alkyl.

21. A moulding composition according to claim 1, wherein the thermoplastic polymer is a sulfated polymer of a partially hydroxylated polybutadiene or polyisoprene.

22. A process for producing a moulding composition according to claim 1, which comprises
 a) electrochemically polymerising a heteroaromatic compound or an aniline in an organic, aqueous-organic or aqueous solution in the presence of a polymeric salt and then removing the pulverulent deposit from the anode, or
 b) reacting a heteroaromatic compound or an aniline in the presence of a polymeric salt and an inert solvent with an oxidising agent.

23. A composition comprising
 a thermoplastic, thermosetting or structurally cross-linked polymer into which
 b) an electrically conductive, finely disperse filler of
  a1) at least one polyheteroaromatic compound or an aniline in the oxidised, polycationic form and
  b1) at least one polyanion of a thermoplastic polymer having sulfated alcohol groups

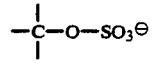

in recurring structural units has been incorporated.

24. A composition according to claim 23, comprising 99.9 to 10% by weight of component a) and 0.1 to 90% by weight of component b).

* * * * *